United States Patent

Schimpff

Patent Number: 5,127,160
Date of Patent: Jul. 7, 1992

[54] METHOD OF FASTENING CONSTRUCTION COMPONENTS IN A CASING FOR SERIES-PRODUCED FINISHED PARTS

[75] Inventor: Frithjof Schimpff, Wiesbaden, Fed. Rep. of Germany

[73] Assignee: Wayss & Freytag Aktiengesellschaft, Frankfurt am Main, Fed. Rep. of Germany

[21] Appl. No.: 397,483
[22] PCT Filed: Jun. 2, 1989
[86] PCT No.: PCT/EP89/00622
§ 371 Date: Aug. 14, 1989
§ 102(e) Date: Aug. 14, 1989
[87] PCT Pub. No.: WO90/15191
PCT Pub. Date: Dec. 13, 1990
[51] Int. Cl.$^5$ .............................................. B23P 17/00
[52] U.S. Cl. ...................................... 29/897.3; 29/512; 29/523
[58] Field of Search .............. 29/897, 897.3, 897.33, 29/512, 522.1, 523; 227/51, 52, 55

[56] References Cited

U.S. PATENT DOCUMENTS

| | | | |
|---|---|---|---|
| 3,078,002 | 2/1963 | Rodgers, Jr. | 29/525.2 X |
| 3,300,798 | 1/1967 | York | 29/512 |
| 4,904,133 | 2/1990 | Wright | 29/512 X |
| 4,948,089 | 8/1990 | Knödel et al. | |

FOREIGN PATENT DOCUMENTS 3629030 4/1988 Fed. Rep. of Germany.
7810412 4/1980 Netherlands.

Primary Examiner—Timothy V. Eley
Assistant Examiner—C. Richard Martin
Attorney, Agent, or Firm—Herbert Dubno

[57] ABSTRACT

In the case of certain series-produced finished parts, such as switch cross ties, the precision of the assembly of components is of decisive importance. The components should neither be damaged nor should their position be changed during assembly. During the assembly process, they have to be non-slidably fastened in the casing, at the same time the fastening is not allowed to damage finished part, respectively the component, neither during the movements occuring in the hardening process, nor during the removal of the casing from the finished part, i.e. a fastening device has also to be easily detachable.

The invention proposes as a temporary connection means the use of a blind rivet (7), which can be introduced and hammered in from above and pushed in from above with its stem (8) through the bore (20) of the bottom plate (19) carrying the component (18), as well as through the bore (20) determining the position of the component (18) in the casing plate (1), and is solidly anchored on the outside of the casing plate (1) by a rivet-head-like enlargement (9).

4 Claims, 6 Drawing Sheets

METHOD OF FASTENING CONSTRUCTION COMPONENTS IN A CASING FOR SERIES-PRODUCED FINISHED PARTS

CROSS REFERENCE TO RELATED APPLICATIONS

This application is a national phase application of PCT/EP89/00622 filed Jun. 2, 1989 and based in turn, on German national application P38 15 176 of May 5, 1988.

FIELD OF THE INVENTION

The invention relates to a method fastening construction components in a casing for series-produced finished parts. More particularly the invention relates to a method of temporary fastening of a component sealed off against concrete infiltration in a casing for finished parts, primarily for prestressed-concrete cross ties, whereby a component provided at least indirectly with a central bore is fastened to the inside of the casing by a temporary connection means passing through this bore and through a bore determining the position of the component in a casing plate.

BACKGROUND OF THE INVENTION

In the case of series-produced finished parts of concrete, primarily switch cross ties, for the insertion of the component, e.g. tube sockets for the rail, fastening screws in the case of the switch cross ties—an accuracy is required which greatly exceeds that otherwise necessary for construction components. It is an important condition that the component can be fixed in the casing without being displaced during the pouring of the concrete, that the finished part can be removed from the casing, and that the cost of the required steps is low. Besides, the connection of the component with the casing has to be shearable, in order not to impede the movements occurring between the finished part and the casing during the hardening process of the concrete and not to cause damage to the finished part or to the component.

A fastening method is known from German open application 36 29 030 (see also U.S. Pat. No. 4,948,089). This open application further describes various types of fastening devices, consisting basically of a pin and a fastening nipple. The nipple holds the pin in a bore in the casing plate, which determines the position of the component within the finished part. The hollow pin and the nipple can assume various shapes which sometimes are very complicated and thus expensive, shapes. Sometimes, the nipples can be built into the casing only from the less accessible bottom side.

OBJECT OF THE INVENTION

It is the object of the invention to reduce the time required for the fastening in an accurate position of the components in the casing for series-produced finished parts and to constructively develop the fastening process.

SUMMARY OF THE INVENTION

With regard to the method, the object is achieved in that a blind rivet which can be inserted and hammered in from above is used as a temporary connection means. The rivet is pushed with its stem from above through the bore into a bottom plate indirectly or directly carrying the component as well as through the therewith aligned bore in the casing plate, until the rivet head stops against the bottom plate, up to the point where the lower edge of the component comes to lie flush against the casing plate. The drawing mandrel is then pulled and simultaneously the pull head is pressed into the stem and with the simultaneous deformation of the stem to a rivet-head-like enlargement is solidly anchored on the outside of the casing plate. The preselected breaking point of the drawing mandrel is provided inside the casing plate, suitably immediately behind the pull head. The wall thickness of the stem of the blind rivet is so selected that the blind rivet is sheared off at the occurrence of a shearing stress of a small but definable value, between the correspondingly resistant bottom plate and casing plate. Components to be fastened by the method of the invention can use a blind rivet which can be tightly attached to the casing plate by means of a loose bottom plate provided with a central bore which, with a contact surface, overlaps the projections formed at the bottom edge of the component.

The lower frontal surface of the component can be tightly pressed against the casing plate by the blind rivet, by keeping the portion of the plate thickness surpassing the thickness of the contact surface of the bottom plate slightly lower in the middle than the thickness of the projections of the component, thereby creating a gap between the lower side of the bottom plate and the upper side of the casing plate. On the projections, preselected breaking points can be established.

At its lower margin resting against the casing plate, the thin bottom plate with a central bore can be formed, through which the component can be tightly attached to the casing plate by the blind rivet. The bottom plate of the component can be curved so that its concave side faces the casing plate.

The bottom plate of the component can be staggered upwardly by a small measure against the lower margin of the component. The component can be made of a hard synthetic material, for instance PA6.6 with the addition of fibers. The bottom plate can be curved so that its concave side faces the casing plate and that in the space created by staggering, between the lower side of the bottom plate and the lower frontal surface of the component, a metal plate with a central bore can be fitted. The device can be made of medium hard synthetic material, for instance PE or PA.

According to another feature of the invention, the bottom plate can be expelled from the casing after the completion of the finished part, due to a preselected breaking line along its surrounding margin. In the bottom plate, a ring concentrically surrounding the bore and made of a superhard material in comparison with the rest of the bottom plate can be built in. A blind rivet for carrying out the method is so constructed that its stem has a preselected breaking point in the plane between the lower side of the bottom plate of the component and the upper side of the casing plate.

The advantage of the method according to the invention is that, instead of a special nipple part with a complicated construction, a blind rivet available in commerce is used for the temporary shearable fastening of the construction component to the casing. The blind rivet, normally devised for fixed connections, meets in a simple way all the requirements of a temporary fastening means of the component to the casing. As opposed to a screw, the blind rivet makes possible to set the required impact point of the connection means for the fastening of the component on the outside of the casing plate, starting from the inside of the casing. At the same time, by establishing the preselected breaking point of the drawing mandrel inside the casing plate, suitably right behind the pull head, so that no part of the drawing mandrel which could reinforce the rivet remains in the rivet stem, as well as by selecting the proper wall thickness and the proper material for the rivet stem, a weak-point of the blind rivet-nipple can be produced with exactly defined strength, so that it can be sheared off in the presence of shearing forces, before any damage could be done to the finished part.

The parts used in the production of switch cross ties are equipped with means allowing the riveting of the component to the casing. In any case, these means have to be removed, before the finished part is used. Furthermore, the rivet in the casing has to be sheared off with certainty. This is done by correspondingly selecting the material for those parts of the device insuring the shearing off of the blind rivet. These device parts can be made of plastic or metal. The loose bottom plate according is suitably also made of the same material.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
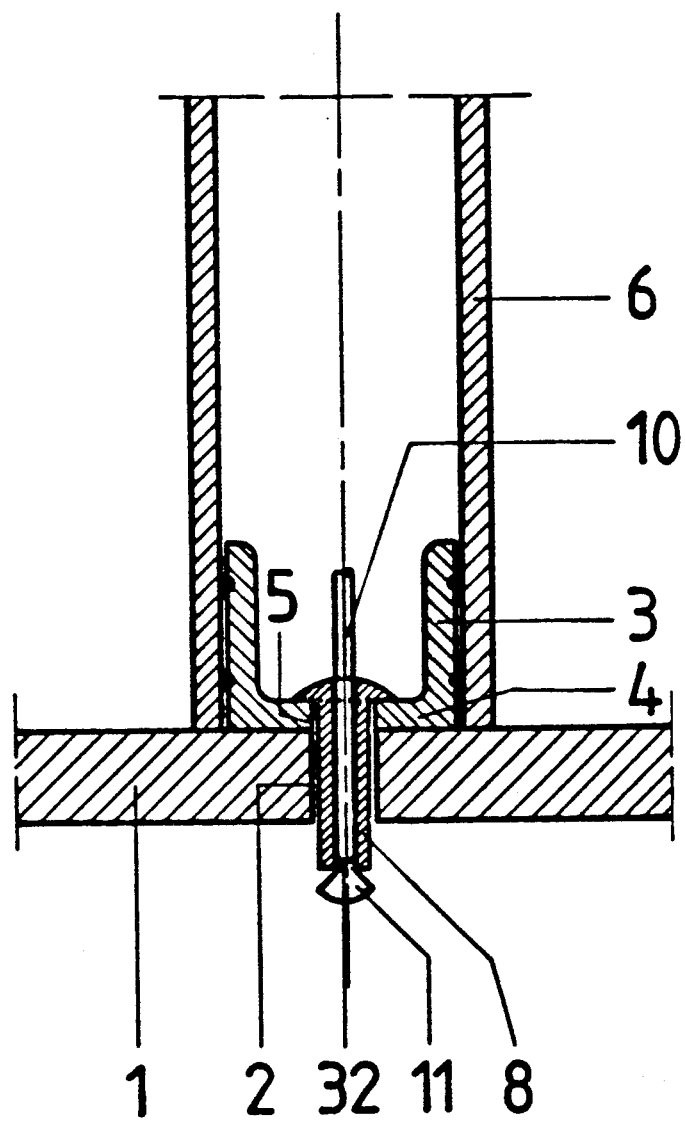
FIGS. 1 and 2 are cross sectional views of a component to be fastened according to the method of the invention, in FIG. 1 showing assembly prior to the extraction of the drawing mandrel, and FIG. 2 in a state of use showing the state of device during the concreting of the finished part; after the extraction of the drawing mandrel.
Figure 2:
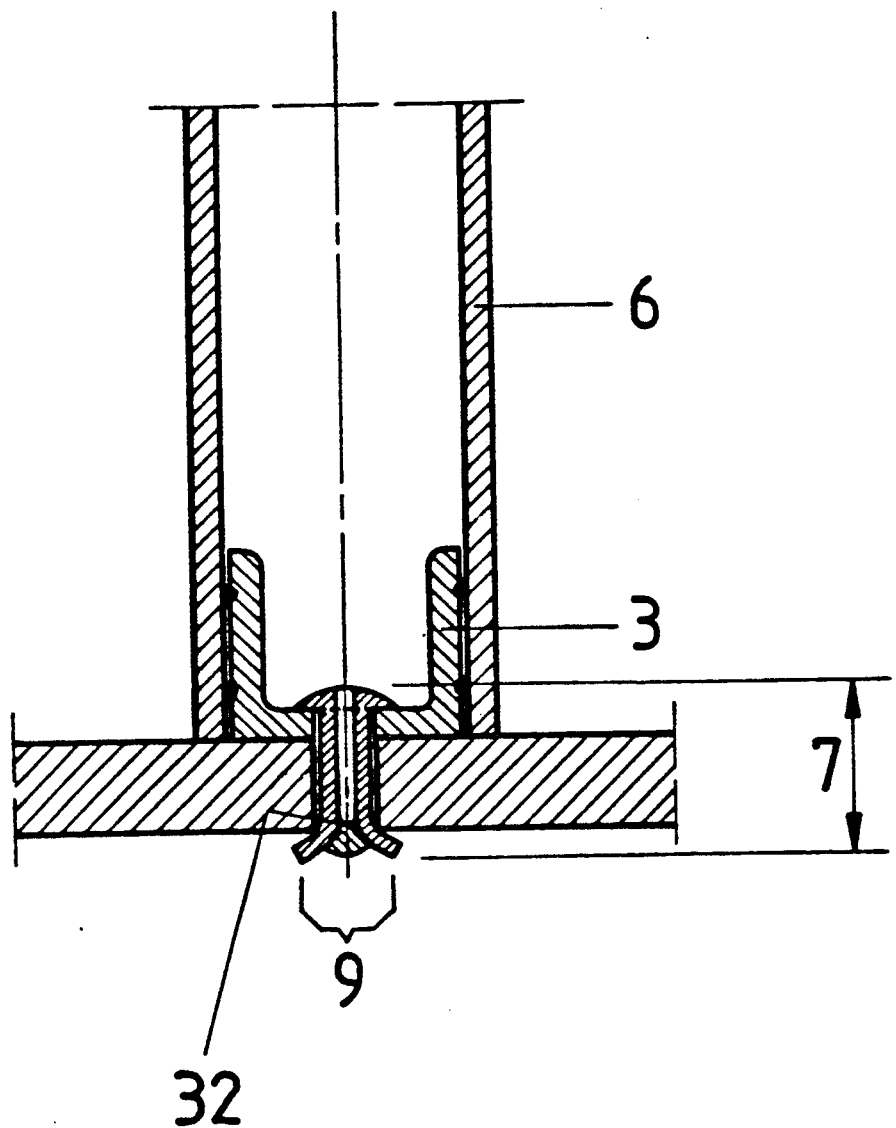

On the casing plate 1, the position of the component 6, in this example a tubular shell—is established by the bore 2. The component 6 is held on the casing plate 1 through a plug 3, over which the component 6 is sealingly slid. The bottom of the plug 3 has a central bore 5. As a connection means, the stem 8 of a blind rivet 7 extends from the inside of the casing through the bore 2 and the bore 5 of the plug 3 (FIG. 1) which is aligned therewith. By pulling the drawing mandrel 10, the pull head 11 is pressed into the steam 8 of the blind rivet 7 and the stem 8 is reshaped into an outer rivet-head-like enlargement 9 on the casing plate 1. The drawing mandrel 10 is extracted, until the pull head 11 after forming the enlargement 9, stops and catches in the opening of the bore 2 and ruptures at the preselected breaking point 32. Now, the connection between the plug 3 holding the part 6 and the casing plate 1 is made solely by the hollow shaft 8 of the blind rivet 7 anchored by the head and head-like enlargement 9, whose material and wall thickness can be selected so that it will be sheared off by shearing forces of a certain strength.

Figure 3:
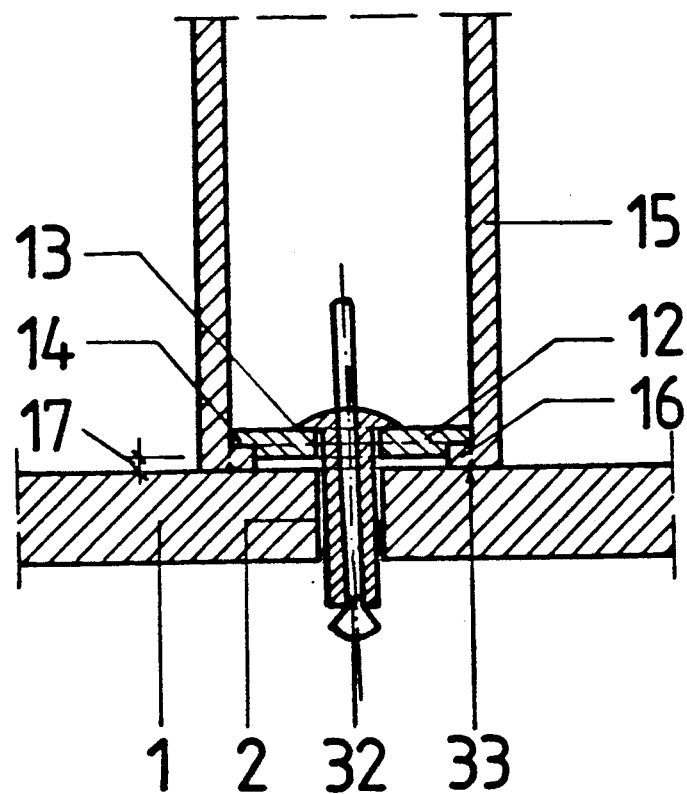
FIG. 3 is a view similar to FIG. 1 according to another embodiment of the invention.

In FIG. 3, a connection means for fastening the component 15 with the casing 1 is shown. The aforedescribed blind rivet 7 extending through the bore 13 of the bottom plate 12 and the bore 2 of the bottom plate 1 connects the bottom plate 12, with its contact surface 14 overlapping the projections 16 formed on the lower edge of the component 15, to the casing plate 1. The thickness of the bottom plate 12 is selected so that a gap 17 remains between the bottom side of the bottom plate 12 and the upper side of the casing plate 1, when the contact surface 14 comes to rest on the brackets of the component 15. This insures that due to its tensional force, the blind rivet 7 presses the component 15 tightly towards the casing plate 1. The projections 16 have preselected breaking points 33, so that they can be removed easily.

Figure 4:
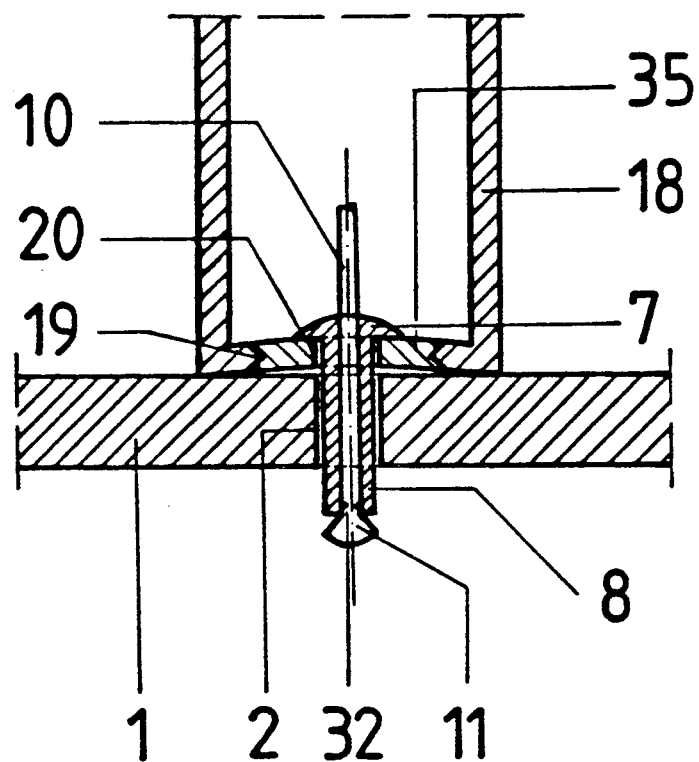
FIG. 4 is a similar view of another embodiment.
Figure 5:
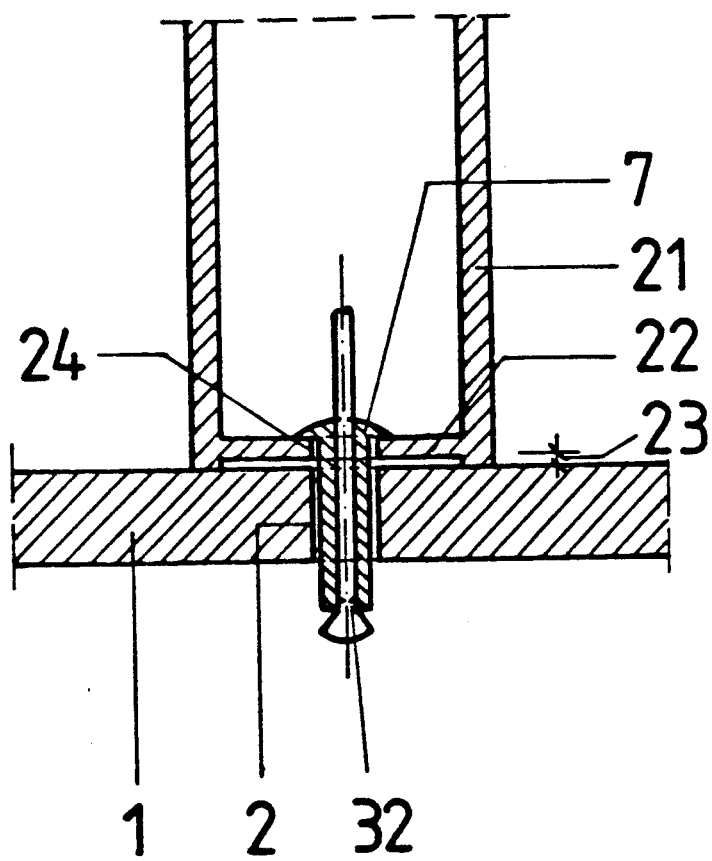
FIG. 5 is a section through still another variant.
Figure 6:
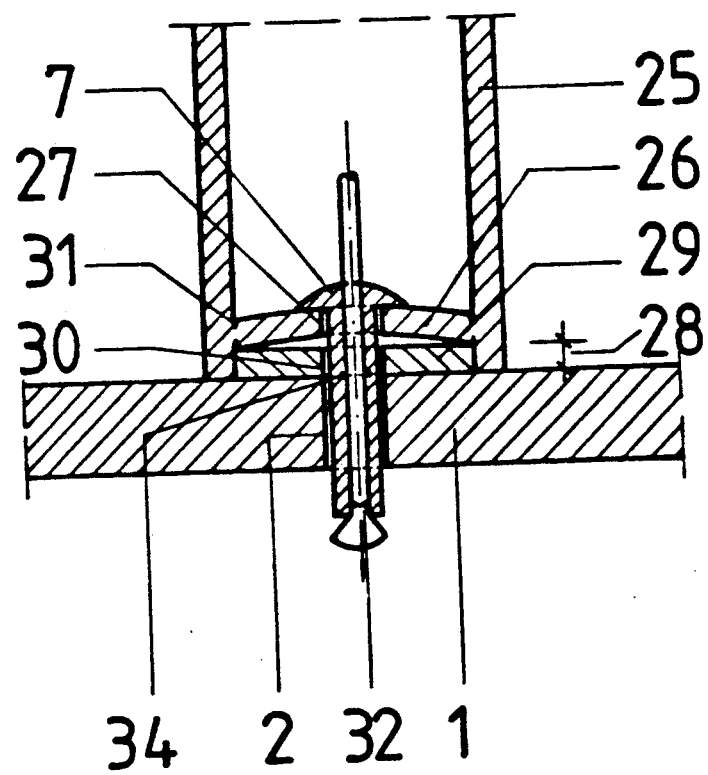
FIG. 6 is a section through a final embodiment.

FIGS. 4 to 6 show examples of solutions for the direct connection of component and casing plate by a blind rivet.

According to FIG. 4, a curved bottom plate 19 is formed in one piece with the component 18. The tensional force of the blind rivet 7 passing through the bore 20 of the bottom plate 19 and the bore 2 of the casing plate 1, which presses against the plate-spring-like bottom-plate 19, causes the component 18 to press tightly against the casing plate 1. In the example, the bottom plate 19 is reinforced by a ring 35 of high-strength material, when compared to the rest of the bottom plate.

FIG. 5 shows a component 21 having a plane bottom plate 22 formed in one piece with the component and stepped by a distance 23 with respect to the lower margin of the component. The blind rivet 7 is driven through the central bore 24 of the bottom plate 22 and the bore 2 of the casing plate 1. The stepped configuration makes possible a tight adherence of the component to the casing plate 1.

A variant of the example according to FIG. 5 is shown in FIG. 6. In the lower component 25, the bottom plate 26 formed in one piece is also stepped by a distance 28, but in addition thereto, it is also curved. In the gap space, a metal plate 29 is fitted. Here the blind rivet 7 passes through the mutually aligned bores 27 of the bottom plate 26 and 30 of the metal plate 29, as well as the bore 2 of the casing plate 1. Analogously to the example of FIG. 5, the curvature of the bottom plate 26 insures a tight adherence of the component 25 to the casing plate 1.

In FIG. 6, a preselected breaking line 31 surrounding the margin of the bottom plate 26 is shown, which facilitates the later separation of the bottom plate 26 from the component 25. Such a preselected breaking line can be provided in all components wherein the bottom plates are formed as parts thereof. In FIG. 6, also a preselected breaking point 34 of the stem 8 of the blind rivet 7 can be seen. This preselected breaking point is meant to facilitate the shearing-off of the rivet in the preestablished shearing plane.

I claim:

1. A method of making a concrete body, comprising the steps of:
   (a) providing a casing for shaping said concrete body and having a casing plate formed with a bore;
   (b) providing a tubular component adapted to be embedded in said body with a bottom plate unitary with said tubular component being delimited by a weakened zone demarcating said plate from said tubular component;
   (c) temporarily anchoring a tubular component to be embedded in said body on said casing plate by:
      (c₁) positioning said component on said casing plate so that said bottom plate is juxtaposed with said casing plate and a bore in said casing plate is positioned in alignment with a bore of said bottom plate, (c₂) driving a blind rivet through said bores from an interior of said component until a rivet head within the interior of said component draws said bottom plate toward said casing plate to seal said tubular component against incursion of concrete, a stem of said rivet traverses said casing plate and a pull head of said rivet lies along an outside of said casing plate, and (c₃) pulling a drawing mandrel of said rivet while pressing said rivet head against said member and drawing said pull head into said stem to enlarge said stem at the outside of said casing plate into a rivet-head-like enlargement temporarily securing said component on said casing plate and retaining said component against said casing plate free from infiltration of concrete into said component, thereby breaking said mandrel off in said stem within said casing plate and immediately adjacent said pull head;

(d) introducing concrete into said casing and causing said concrete to harden, thereby forming said body and embedding said component in the concrete without infiltration of concrete into said component; and (e) removing said body from said casing and separating said bottom plate from said tubular component by rupturing said weakened zone.

2. The method defined in claim 1 wherein said bottom plate is curved and positioned with a concave side turned toward said casing plate.

3. The method defined in claim 1 wherein said bottom plate is stepped away from said casing plate by a small clearance.

4. The method defined in claim 1 wherein said bottom plate is separable from said component along a preselected breaking line along a margin of said bottom plate.

* * * * *